(12) United States Patent
Tanaka (10) Patent No.: US 12,044,285 B2
(45) Date of Patent: Jul. 23, 2024

(54) VALVE ADJUSTMENT DEVICE AND SHOCK ABSORBER

(71) Applicant: KYB MOTORCYCLE SUSPENSION CO., LTD., Gifu (JP)

(72) Inventor: Shin Tanaka, Gifu (JP)

(73) Assignee: KYB Motorcycle Suspension Co., Ltd., Gifu (JP)

( * ) Notice: Subject to any disclaimer, the term of this patent is extended or adjusted under 35 U.S.C. 154(b) by 0 days.

(21) Appl. No.: 17/768,380

(22) PCT Filed: Feb. 16, 2021

(86) PCT No.: PCT/JP2021/005617
§ 371 (c)(1),
(2) Date: Apr. 12, 2022

(87) PCT Pub. No.: WO2021/192733
PCT Pub. Date: Sep. 30, 2021

(65) Prior Publication Data
US 2024/0125372 A1 Apr. 18, 2024

(30) Foreign Application Priority Data
Mar. 23, 2020 (JP) .................................. 2020-051669

(51) Int. Cl.
*F16F 9/44* (2006.01)
(52) U.S. Cl.
CPC .................................... *F16F 9/446* (2013.01)
(58) Field of Classification Search
CPC ............... F16F 9/34; F16F 9/446; F16K 5/10
See application file for complete search history.

(56) References Cited

U.S. PATENT DOCUMENTS

| 4,337,850 A * | 7/1982 | Shimokura | ............ F16F 9/467 74/553 |
| 4,582,084 A * | 4/1986 | Gyurovits | ................ F16K 5/10 137/493.8 |

(Continued)

FOREIGN PATENT DOCUMENTS

| JP | H01-096543 U | 6/1989 |
| JP | 2007-298063 A | 11/2007 |

(Continued)

OTHER PUBLICATIONS

Apr. 6, 2021, International Search Report issued for related PCT Application No. PCT/JP2021/005617.

*Primary Examiner* — Thomas W Irvin
(74) *Attorney, Agent, or Firm* — Paratus Law Group, PLLC (57) ABSTRACT

A valve adjustment device according to the present invention includes: a shaft having a screw portion on an outer periphery, the shaft being displaceable in an axial direction by rotation in a peripheral direction, the shaft applying displacement to a valve that changes resistance applied to a flow of hydraulic oil (fluid) by transmission of the displacement; a ball received in a hole opening in a radial direction from a side of the shaft; a spring received in the hole and biasing the ball outward from the hole; and a notch case that has a tubular shape, into which the shaft is inserted, and that has a plurality of detent grooves that is provided along the axial direction on an inner periphery to receive the ball fitted thereinto. At least one of the detent grooves is shorter than the other detent grooves.

5 Claims, 7 Drawing Sheets

(56) References Cited

U.S. PATENT DOCUMENTS

| | | | | |
|---|---|---|---|---|
| 8,622,180 B2 * | 1/2014 | Wootten | ............... | F16F 9/461 |
| | | | | 267/64.18 |
| 9,027,719 B2 * | 5/2015 | Ito | ..................... | F16F 9/446 |
| | | | | 188/314 |
| 9,821,623 B1 * | 11/2017 | Liao | .................... | F16F 9/065 |
| 11,602,971 B2 * | 3/2023 | Strickland | ............ | F16K 17/048 |
| 2011/0174582 A1 * | 7/2011 | Wootten | ............... | F16F 9/461 |
| | | | | 188/266 |
| 2012/0255822 A1 | 10/2012 | Ito | | |

FOREIGN PATENT DOCUMENTS

| | | | |
|---|---|---|---|
| JP | 2009-138756 A | | 6/2009 |
| JP | 2011-208660 A | | 10/2011 |
| JP | 2021127779 A | * | 9/2021 |

\* cited by examiner

VALVE ADJUSTMENT DEVICE AND SHOCK ABSORBER

CROSS REFERENCE TO PRIOR APPLICATION

This application is a National Stage Patent Application of PCT International Patent Application No. PCT/JP2021/005617 (filed on Feb. 16, 2021) under 35 U.S.C. § 371, which claims priority to Japanese Patent Application No. 2020-051669 (filed on Mar. 23, 2020), which are all hereby incorporated by reference in their entirety.

TECHNICAL FIELD

The present invention relates to a valve adjustment device and a shock absorber.

BACKGROUND ART

A shock absorber is used, for example, by being interposed between a vehicle body and a wheel of a straddle vehicle and suppresses vibrations of the vehicle body and the wheel by damping force generated during expansion and contraction.

The shock absorber generates the damping force by a valve mounted inside but may be mounted with a valve having a damping force adjustment function in order to enable a user to tune ride quality in the vehicle.

The valve mounted on such a shock absorber includes, for example, a valve seat and a needle that moves close to or away from the valve seat, and the valve changes the damping force when a position of the needle with respect to the valve seat is changed by a valve adjustment device.

For example, as disclosed in JP 2009-138756 A, a valve adjustment device includes a tubular notch case attached to a housing in which a valve seat is formed, an adjuster screwed into the housing, and a detent mechanism provided for stopping the rotation of the adjuster with respect to the notch case, and a needle is integrally provided at a distal end of the adjuster. The detent mechanism includes a spring received in a hole provided in the adjuster, a ball inserted into the hole and biased by the spring in a direction exiting from the hole, and a plurality of detent grooves provided in the notch case. Then, when the ball is biased by the spring and fitted into the detent groove, the rotation of the adjuster with respect to the notch case is regulated, and the adjuster can be fixed at the position that the ball is fitted into the detent groove.

Therefore, when the user operates and rotates the adjuster, the needle rotates together with the adjuster with respect to the housing and the notch case advances and retreats in the housing in the manner of a feed screw to move close to or away from the valve seat.

When the position of the needle is changed with respect to the valve seat, since a flow path area in the valve changes, the damping force generated by the shock absorber increases as the flow path area decreases, and conversely, the damping force generated by the shock absorber decreases as the flow path area increases. As described above, in the shock absorber including the valve adjustment device, the level of the damping force of the shock absorber can be adjusted by the user's operation.

In addition, when the adjuster is stopped at a position at which the ball is fitted into the detent groove, the rotation of the adjuster is regulated by the detent mechanism, the adjuster is prevented from naturally rotating due to vibrations or the like, and the position of the needle with respect to the valve seat is prevented from changing, so that the shock absorber can exert the damping force as adjusted by the user.

CITATION LIST

Patent Literature

Patent Literature 1: JP 2009-138756 A

SUMMARY OF INVENTION

Technical Problem

When the user rotates the adjuster with respect to the notch case, if the ball enters the detent groove, the user perceives a click feeling and therefore, the user operates and rotates the adjuster to adjust the level of the damping force while depending on the number of click feelings (the number of clicks).

Figure 7:
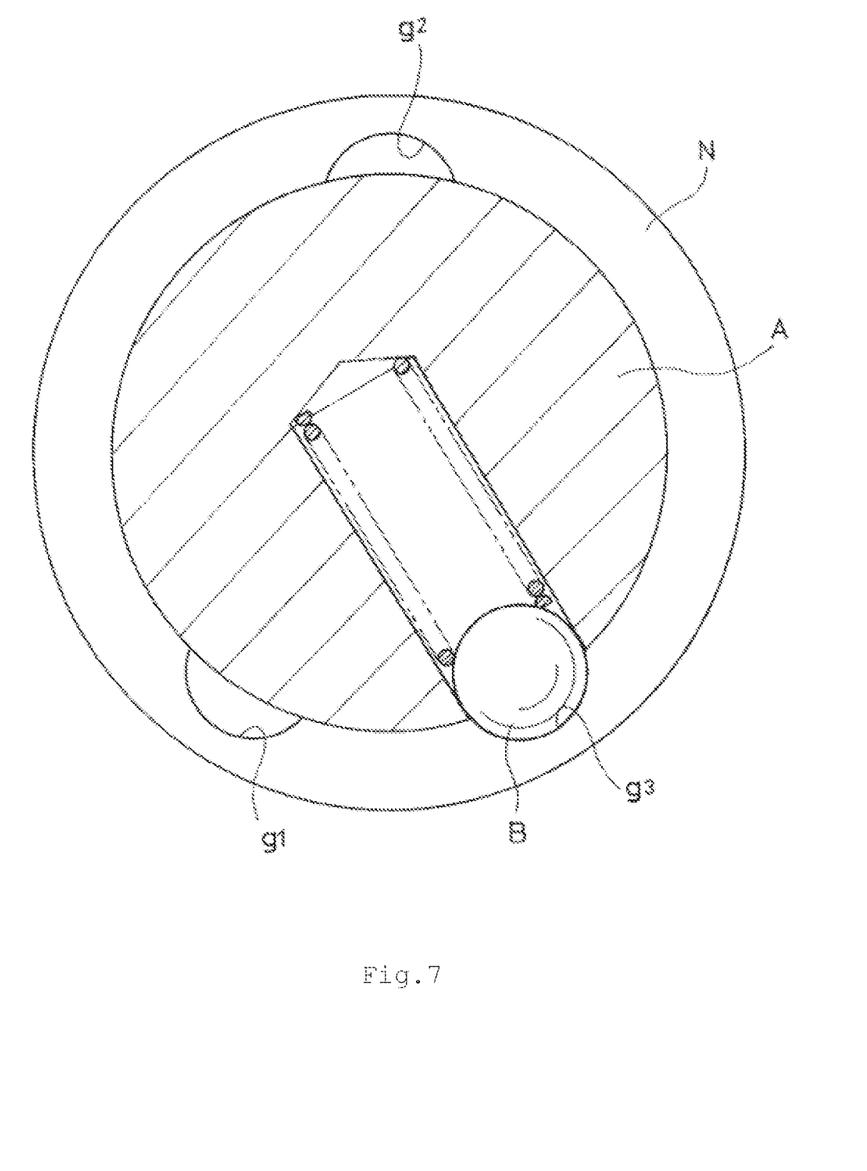
FIG. 7 is a bottom view of a notch case of a conventional valve adjustment device.

Here, in a case where the damping force is set to be switched from the minimum to the maximum when a rotation operation amount of the adjuster is within one rotation, as illustrated in FIG. 7, an interval between a detent groove g1 into which a ball B is to be fitted when the damping force is minimized in a peripheral direction of a notch case N and a detent groove g3 into which the ball B is to be fitted when the damping force is maximized may become very narrow. In this example, in addition to the two detent grooves g1 and g3 described above, a detent groove g2 is provided in the middle between the detent groove g1 and the detent groove g3 in the notch case N. As for a rotation range of an adjuster A, an appropriate range is from a position at which a ball B is fitted into the detent groove g1 to a position at which the ball B is fitted into the detent groove g3 via the detent groove g2. However, when an angle when the damping force is changed from the maximum to the minimum is set to any value, an interval between the detent groove g1 and the detent groove g3 may become narrow outside the rotation range of the adjuster A.

Here, the limit of movement of the adjuster A in an axial direction is set by, for example, abutment of the adjuster A on the notch case N and a housing, but the adjuster A may rotate beyond a designed rotation amount (rotation angle) due to a dimensional tolerance of the adjuster A or each of the other members constituting the valve adjustment device.

In such a case, when the user maximumly operates the adjuster A to minimize the damping force of the shock absorber, the adjuster A may rotate to a position at which the ball B passes through the detent groove g1 and is fitted into the detent groove g3, or when the user maximizes the damping force of the shock absorber, the adjuster A may rotate to a position at which the ball B passes through the detent groove g3 and the ball B is fitted into the detent groove g1. As described above, the adjuster A may rotate beyond a design rotation amount (design rotation angle), the ball B may go beyond the detent grooves g1 and g3 of the notch case N excessively due to the rotation beyond the design rotation amount, and the number of clicks may become larger than a design value.

When such a situation occurs, if the user tries to adjust the damping force while depending on the number of clicks, the number of clicks becomes larger than the design value and therefore the position of the adjuster A may be adjusted to a position at which damping force desired by the user cannot be exerted. Thus, in the conventional valve adjustment device and shock absorber, it is difficult to adjust the valve so as to obtain the damping force as desired by the user.

Therefore, an object of the present invention is to provide a valve adjustment device and a shock absorber capable of easily adjusting the resistance of a valve and the damping force of the shock absorber as intended by the user.

Solution to Problem

In order to solve the problem described above, a valve adjustment device according to the present invention includes: a shaft having a screw portion on an outer periphery, the shaft being displaceable in an axial direction by rotation in a peripheral direction, the shaft applying displacement to a valve that changes resistance applied to a flow of fluid by transmission of the displacement; a ball received in a hole opening in a radial direction from a side of the shaft; a spring received in the hole and biasing the ball outward from the hole; and a notch case that has a tubular shape, into which the shaft is inserted, and that has a plurality of detent grooves that is provided along the axial direction on an inner periphery to receive the ball fitted thereinto, wherein at least one of the detent grooves is shorter than the other detent grooves.

In the valve adjustment device configured as described above, since any one of the detent grooves formed on the inner periphery of the notch case is set to be short, the number of times the ball is fitted into the short detent groove can be set to any number. Therefore, even if the shaft becomes rotatable a little beyond the design allowable number of rotations due to a dimensional error, the number of clicks can be set as designed.

In addition, in the valve adjustment device, a multiple threaded screw with two or more threads is used as the screw portion of the shaft to set large lead. In the valve adjustment device configured as described above, a rotation amount (rotation angle) of the shaft required to change the resistance applied to the flow of the fluid by the valve from the maximum to the minimum can be reduced, the burden of damping force adjusting work on the user can be reduced, and the rotation amount (rotation angle) of the shaft can be set to less than one rotation (less than 360 degrees) to improve practicality.

In addition, the detent grooves may be provided at unequal intervals on the inner periphery of the notch case. In the valve adjustment device configured as described above, the detent grooves can be optimally disposed in the notch case, and the resistance applied by the valve to the fluid can be linearly changed.

Furthermore, the valve adjustment device may include an operation unit having a mark at one end of the shaft. The valve adjustment device configured as described above enables the user to view a rotational position of the operation unit and therefore enables the user to grasp the magnitude of the resistance applied by the valve to the current flow of the fluid from the outside.

In addition, the shock absorber includes a shock absorber main body having a cylinder, a piston movably inserted into the cylinder, a piston rod movably inserted into the cylinder and connected to the piston, and a valve that changes resistance applied to a flow of fluid when displacement is transmitted, the shock absorber main body generating damping force during expansion and contraction, and the valve adjustment device. The valve changes the resistance when displacement is applied from the shaft. In the shock absorber configured as described above, even if the shaft can rotate a little beyond a design allowable rotation amount (allowable rotation angle) due to a dimensional error, the number of clicks does not increase, and the user can easily adjust the damping force of the shock absorber so as to obtain damping force as desired while depending on the number of clicks.

Advantageous Effects of Invention

As described above, the valve adjustment device and the shock absorber of the present invention enables the user to easily adjust the resistance in the valve and the damping force in the shock absorber as intended by the user.

DESCRIPTION OF EMBODIMENTS

Figure 1:
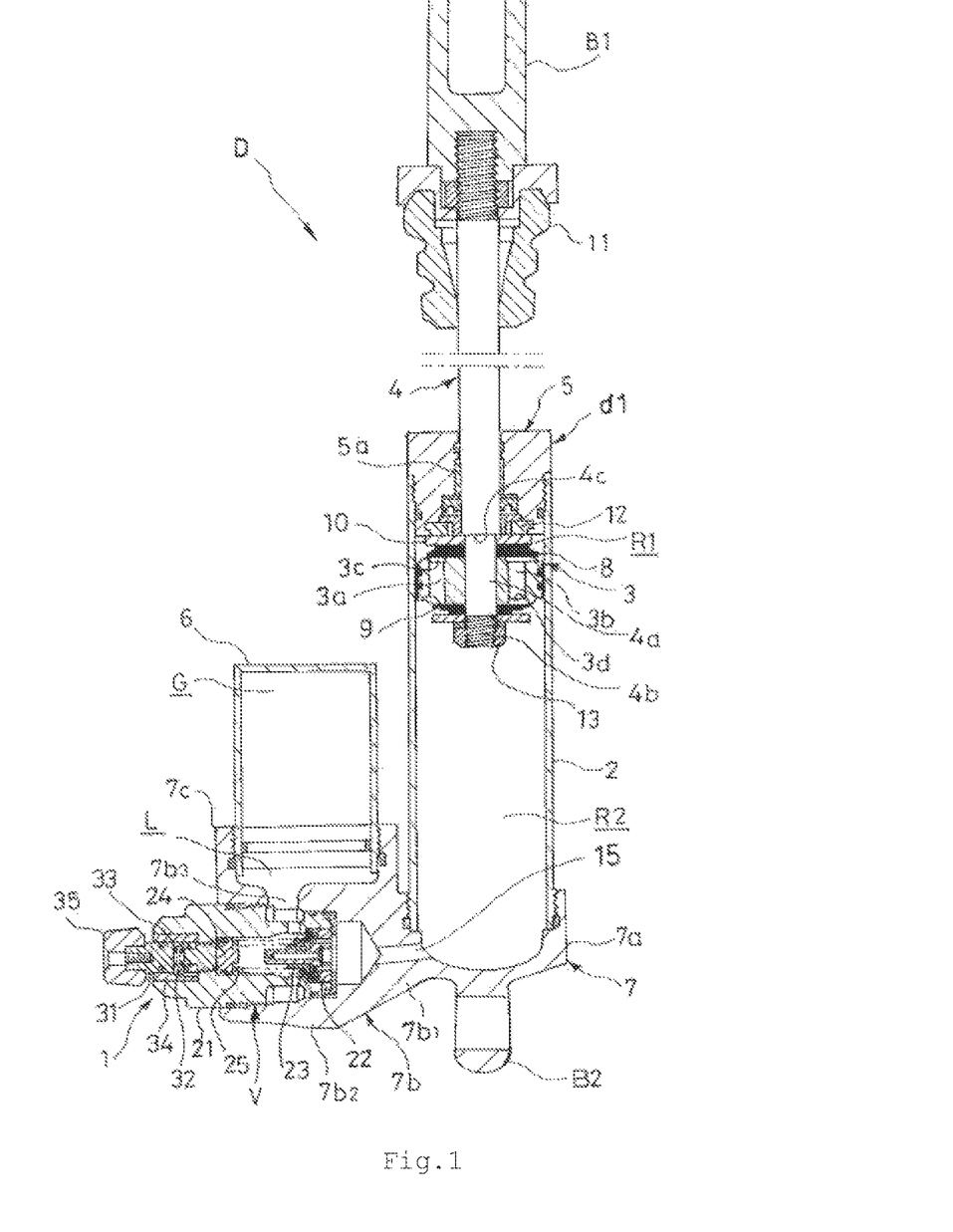
FIG. 1 is a longitudinal sectional view of a shock absorber according to an embodiment.
Figure 2:
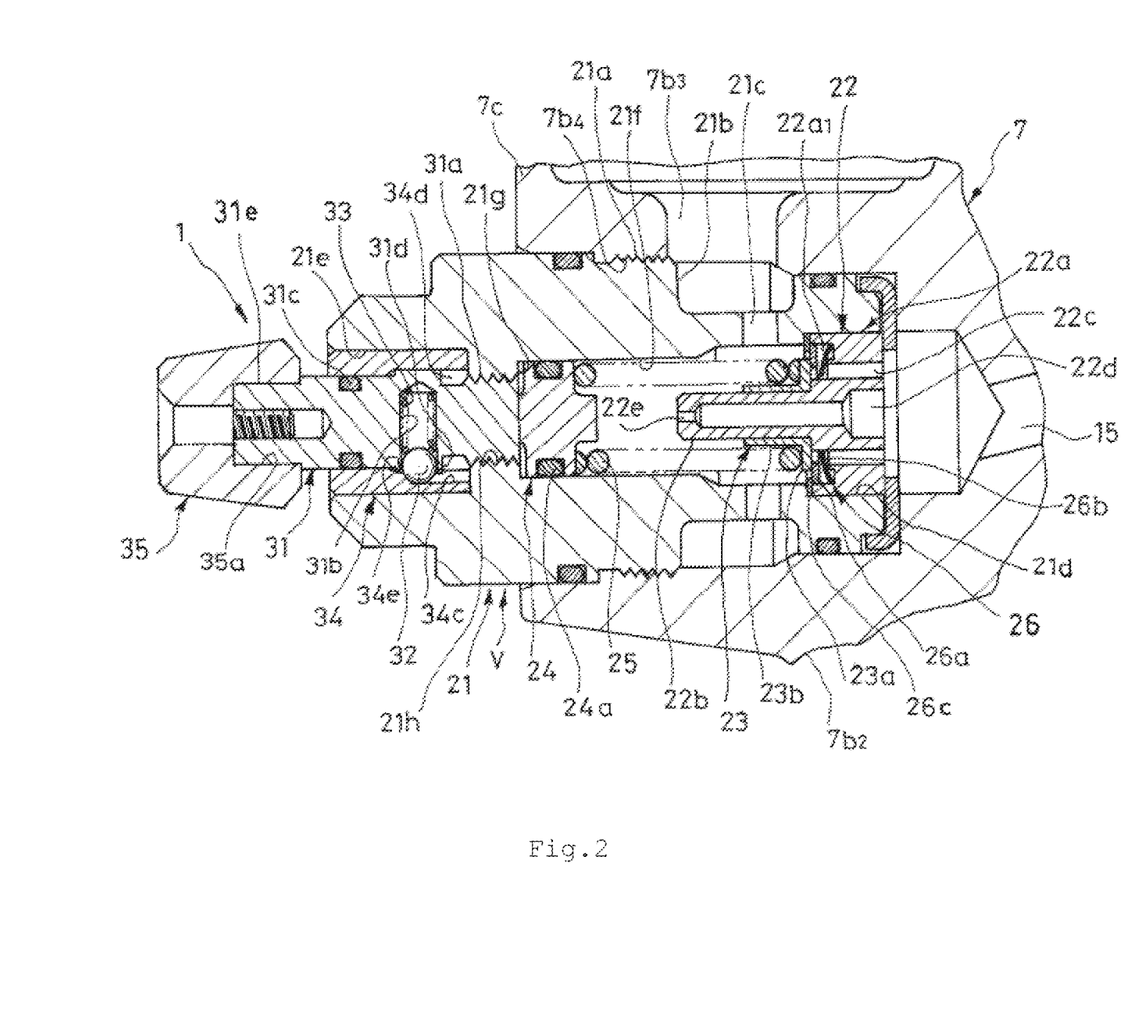
FIG. 2 is an enlarged cross-sectional view of a valve adjustment device according to an embodiment.

Hereinafter, the present invention will be described on the basis of embodiments illustrated in the drawings. As illustrated in FIGS. 1 and 2, a valve adjustment device 1 according to an embodiment is incorporated in a shock absorber D. Then, the shock absorber D includes a shock absorber main body d1 including a cylinder 2, a piston 3 movably inserted into the cylinder 2, a piston rod 4 movably inserted into the cylinder 2 and connected to the piston 3, and a valve V, and a valve adjustment device 1 capable of changing resistance applied to a flow of fluid by the valve V. Then, in the case of the shock absorber D, the shock absorber D is used by being disposed between a vehicle body and a wheel in a vehicle (not illustrated) and suppresses vibrations of the vehicle body and the wheel.

Hereinafter, each part of the shock absorber main body d1 and the valve adjustment device 1 will be described in detail. As illustrated in FIG. 1, an annular rod guide 5 is attached to an upper end of the cylinder 2 in FIG. 1, and a housing 7 that closes a lower end of the cylinder 2 to house the valve adjustment device 1 and connects a reservoir tank 6 to the cylinder 2 is attached to the lower end of the cylinder 2 in FIG. 1. Then, in the cylinder 2, the piston rod 4 to which the piston 3 is attached at a distal end is movably inserted.

The piston rod 4 is slidably inserted into a tubular bush 5a attached to the inner periphery of the rod guide 5 and inserted into the cylinder 2, and the movement of the piston rod 4 in an axial direction is guided by the rod guide 5. In addition, the inside of the cylinder 2 is partitioned by the piston 3 into an extension side chamber R1 and a compression side chamber R2 that are filled with fluid such as hydraulic oil. Note that in addition to the hydraulic oil, for example, gas as well as liquid such as water or an aqueous solution can be used as the fluid. Note that the valve V in the present embodiment is used in the shock absorber D filled with the hydraulic oil, and applies resistance to the flow of the hydraulic oil using the fluid as the hydraulic oil.

The piston rod 4 includes a small diameter portion 4a provided at a distal end that is a lower end in FIG. 1, a screw portion 4b provided on the outer periphery of a distal end of the small diameter portion 4a, and a step portion 4c formed by providing the small diameter portion 4a, and an upper end protrudes to the outside of the cylinder 2. In addition, a bracket B1 connectable to a member that holds the wheel in the vehicle (not illustrated) or the vehicle body is attached to the upper end of the piston rod 4 in FIG. 1, and a tubular bump cushion 11 is attached to an outer periphery near the upper end in FIG. 1.

If the bump cushion 11 abuts on the rod guide 5 and is compressed when the shock absorber main body d1 is maximally contracted, the bump cushion 11 exerts resilient force to mitigate an impact when the shock absorber main body d1 is maximally contracted.

In addition, the annular piston 3 is fitted into the outer periphery of the small diameter portion 4a of the piston rod 4, together with an annular compression side leaf valve 8 overlapped on an upper side of the piston 3 in FIG. 1, a valve stopper 10 overlapped on an upper side of the compression side leaf valve 8 in FIG. 1, and an annular extension side leaf valve 9 overlapped on a lower side of the piston 3 in FIG. 1. The piston 3, the compression side leaf valve 8, the valve stopper 10, and the extension side leaf valve 9 are sandwiched between a nut 13 screwed into the screw portion 4b of the piston rod 4 and the step portion 4c and are fixed on the outer periphery of the small diameter portion 4a of the piston rod 4.

The piston 3 includes a compression side passage 3a and an extension side passage 3b that penetrate the piston 3 in the axial direction. In addition, the piston 3 includes a window 3d opening from an outer periphery at an upper end in FIG. 1 and communicating with the extension side passage 3b and a window 3c opening from an outer periphery at a lower end in FIG. 1 and communicating with the compression side passage 3a.

The compression side leaf valve 8 is a stacked leaf valve formed by stacking a plurality of annular plates and has an inner periphery fixed to the piston rod 4 but is allowed to bend on an outer periphery side. In addition, the compression side leaf valve 8 is overlapped on the upper side of the piston 3 in FIG. 1 to close an outlet end that is an upper end of the compression side passage 3a in FIG. 1. When the compression side leaf valve 8 is deflected by receiving pressure from a side of the compression side chamber R2, the compression side leaf valve 8 forms a gap between the compression side leaf valve 8 and the piston 3 to open the compression side passage 3a and applies resistance to a flow of the hydraulic oil flowing from the compression side chamber R2 toward the extension side chamber R1. Note that since the window 3d is provided, an inlet end that is the upper end of the extension side passage 3b in FIG. 1 is not closed by the compression side leaf valve 8.

When the compression side leaf valve 8 is greatly deflected, the valve stopper 10 abuts on the back surface of the compression side leaf valve 8 to regulate the further deflection of the compression side leaf valve 8. In addition, the valve stopper 10 also functions as a cushion receiver that is held by the rod guide 5 and abuts on the annular cushion 12 disposed on the outer periphery of the piston rod 4 when the shock absorber main body d1 is maximally extended to alleviate an impact when the shock absorber main body d1 is maximally extended.

The extension side leaf valve 9 is a stacked leaf valve formed by stacking a plurality of annular plates and has an inner periphery fixed to the piston rod 4 but is allowed to deflect on an outer periphery side. In addition, the extension side leaf valve 9 is overlapped on the lower side of the piston 3 in FIG. 1 to close an outlet end that is a lower end of the extension side passage 3b in FIG. 1. When the extension side leaf valve 9 is deflected by receiving pressure from a side of the extension side chamber R1, the extension side leaf valve 9 forms a gap between the extension side leaf valve 9 and the piston 3 to open the extension side passage 3b and applies resistance to a flow of the hydraulic oil flowing from the extension side chamber R1 toward the compression side chamber R2. Note that an inlet end that is a lower end of the compression side passage 3a in FIG. 1 is not closed by the extension side leaf valve 9 because the window 3c is provided.

In the present embodiment, the housing 7 includes a bottom cap 7a attached to the lower end of the cylinder 2 in FIG. 1, a hollow valve housing 7b connected to the bottom cap 7a, houses the valve V and holding the valve adjustment device 1, and a socket 7c connected to the valve housing 7b and holding the reservoir tank 6.

In addition, the bottom cap 7a is fitted into the lower end of the cylinder 2 in FIG. 1 to close the lower end of the cylinder 2 and includes a bracket B2 connectable to the member that holds the wheel in the vehicle (not illustrated) or the vehicle body on a lower side in FIG. 1.

The valve housing 7b includes a base portion 7b1 connected to the bottom cap 7a and a tubular valve housing cylinder 7b2 provided in the base portion 7b1. The valve V is housed in the valve housing cylinder 7b2, and the valve adjustment device 1 is attached to the inner periphery of an opening of the valve housing cylinder 7b2.

The socket 7c has an annular shape and has a proximal end connected to the base portion 7b1 and a side of the valve housing cylinder 7b2 in the valve housing 7b. In addition, the reservoir tank 6 is screwed into a distal end side opening of the socket 7c.

The inside of the socket 7c communicates with the inside of the valve housing cylinder 7b2 via a port 7b3 opening from a side portion of the valve housing cylinder 7b2. The inside of the valve housing cylinder 7b2 communicates with the compression side chamber R2 via a communication passage 15 formed from the base portion 7b1 to the bottom cap 7a. Therefore, the inside of the socket 7c communicates with the inside of the compression side chamber R2 via the port 7b3, the inside of the valve housing cylinder 7b2, and the communication passage 15.

In the present embodiment, the reservoir tank 6 has a cylindrical shape and is screwed into the socket 7c. Then, a free piston 18 is slidably inserted into the reservoir tank 6, and the reservoir tank 6 is partitioned by the free piston 18 into a liquid chamber L communicating with the compression side chamber R2 and a gas chamber G filled with gas.

The valve V includes a tubular sleeve 21 inserted into the valve housing cylinder 7b2, a valve seat member 22 fitted into the sleeve 21, a valve body 23 that is separated from and seated on the valve seat member 22, a spring seat 24 slidably inserted into the sleeve 21, a spring 25 interposed between the valve body 23 and the spring seat 24 and biasing the valve body 23, and a check valve 26 provided between the valve seat member 22 and the valve body 23.

As illustrated in FIG. 2, the sleeve 21 has a tubular shape and includes a screw portion 21a on an outer periphery, and the sleeve 21 is housed and fixed in the valve housing cylinder 7b2 by screwing the screw portion 21a into a screw portion 7*b*4 formed on the inner periphery of the valve housing cylinder 7*b*2. In addition, as described above, the sleeve 21 includes, on the outer periphery, an annular recess 21*b* that faces the port 7*b*3 when the sleeve 21 is housed in the valve housing cylinder 7*b*2, and the sleeve 21 also includes a through hole 21*c* communicating the annular recess 21*b* with the inside of the sleeve 21. Therefore, the inside of the sleeve 21 communicates with the liquid chamber L in the reservoir tank 6 via the through hole 21*c*, the annular recess 21*b*, and the port 7*b*3, and in addition, the inside of the sleeve 21 communicates with the compression side chamber R2 via the communication passage 15. That is, the liquid chamber L and the compression side chamber R2 communicate with each other via the sleeve 21.

In addition, the inner diameters of a distal end of the sleeve 21 that is the right end in FIG. 2 and a proximal end of the sleeve 21 that is the left end in FIG. 2 are larger than the inner diameter of an intermediate portion 21*f*. Then, a valve seat fitting portion 21*d* into which the valve seat member 22 is fitted is formed in a large diameter portion on a distal end side of the sleeve 21, and a case housing portion 21*e* into which a notch case 34 in the valve adjustment device 1 is press-fitted is formed in a large diameter portion on a proximal end side of the sleeve 21. In addition, in an intermediate portion of the sleeve 21, an inner diameter on the proximal end side is smaller than an inner diameter on the distal end side, and a step portion 21*g* is formed on the inner periphery of the intermediate portion of the sleeve 21. In addition, the sleeve 21 includes a screw portion 21*h* on a left side of the step portion 21*g* on the inner periphery of the intermediate portion.

The valve seat member 22 includes a disc portion 22*a* having a disc shape and fitted into the valve seat fitting portion 21*d*, a columnar guide portion 22*b* rising from the center of the disc portion 22*a*, a port 22*c* penetrating the disc portion 22*a*, a longitudinal hole 22*d* opening from the disc portion 22*a* and formed toward a distal end side of the guide portion 22*b*, and an orifice hole 22*e* communicating the longitudinal hole 22*d* with a distal end of the guide portion 22*b*.

The disc portion 22*a* includes an annular recess 22*a*1 communicating with the port 22*c* at the left end in FIG. 2. An annular check valve body 26*a* and an annular spring member 26*b* are received in the annular recess 22*a*1 of the disc portion 22*a*. The check valve body 26*a* has a plurality of notches on an inner periphery although the notches are not denoted with a reference sign, and the check valve body 26*a* is in sliding contact with an inner wall forming the annular recess 22*a*1 in the disc portion 22*a* and is movable in an axial direction with respect to the disc portion 22*a*. In the present embodiment, the spring member 26*b* is formed by bending an annular disk with a line passing through a diameter of the disk as a bend line and biases the check valve body 26*a* in a direction causing the check valve body 26*a* to exit from the annular recess 22*a*1.

In addition, when the disc portion 22*a* is fitted into the valve seat fitting portion 21*d* of the sleeve 21, an annular washer 26*c* is interposed between the outer periphery of the left end of the disc portion 22*a* in FIG. 2 and a step portion at a boundary between the valve seat fitting portion 21*d* of the sleeve 21 and the intermediate portion 21*f*. An outer diameter of the washer 26*c* is set to be the same as an outer diameter of the disc portion 22*a*, and the washer 26*c* is fitted into the inner periphery of the valve seat fitting portion 21*d*. Therefore, the valve seat member 22 and the washer 26*c* are positioned in a radial direction with respect to the sleeve 21, so that both the valve seat member 22 and the washer 26*c* are disposed concentrically with respect to the sleeve 21. In addition, an inner diameter of the washer 26*c* is smaller than an inner diameter of the annular recess 22*a*1 of the disc portion 22*a* and an outer diameter of the check valve body 26*a* and is larger than an outer diameter of the annular recess 22*a*1. Even if the washer 26*c* is overlapped on the disc portion 22*a*, the annular recess 22*a*1 is not closed. In addition, when the disc portion 22*a* and the washer 26*c* are fitted into the valve seat fitting portion 21*d* of the sleeve 21, the check valve body 26*a* received in the annular recess 22*a*1 of the disc portion 22*a* is biased by the spring member 26*b* and abuts on the washer 26*c*.

When the disc portion 22*a* of the valve seat member 22 is fitted into the valve seat fitting portion 21*d* of the sleeve 21, the valve seat member 22 closes a distal end side opening of the sleeve 21. Therefore, the inside of the sleeve 21 communicates with the compression side chamber R2 through the port 22*c*. Note that the through hole 21*c* is opened on the distal end side of the sleeve 21 from a position that is in the intermediate portion of the sleeve 21 and at which the step portion 21*g* is provided, and consideration is given so that the valve seat member 22 does not close the through hole 21*c*.

The valve body 23 includes an annular valve portion 23*a* that is separated from and seated on the left end of the valve seat member 22 in FIG. 2 and can open and close an outlet end of the port 22*c*, and a tubular slide portion 23*b* rising from the inner periphery of the valve portion 23*a* and coming into sliding contact with the outer periphery of the guide portion 22*b* of the valve seat member 22. The valve body 23 is movable in the axial direction along the guide portion 22*b* of the valve seat member 22 and can move close to or away from the disc portion 22*a* of the valve seat member 22. In addition, an inner diameter of the valve body 23 is smaller than the inner diameter of the annular recess 22*a*1 of the disc portion 22*a*, and when the valve body 23 abuts on the inner periphery of the disc portion 22*a*, the further movement of the valve body 23 to a side of the disc portion 22*a* is regulated, and the valve body 23 does not enter the annular recess 22*a*1. An outer diameter of the valve portion 23*a* is smaller than the inner diameter of the washer 26*c* and is set to a diameter such that the valve portion 23*a* closes the notches of the check valve body 26*a* when the valve portion 23*a* abuts on the check valve body 26*a*.

Then, when the valve body 23 abuts on the inner periphery of the disc portion 22*a*, the valve body 23 also abuts on an end surface on the left end surface of the check valve body 26*a* in FIG. 2 and closes the notches on an inner peripheral side of the check valve body 26*a*. The port 22*c* communicates with the valve portion 23*a* through the inside of the annular recess 22*a*1 and the spring member 26*b* and further through the notches of the check valve body 26*a*. Therefore, when the valve body 23 abuts on the inner periphery of the disc portion 22*a*, the valve body also abuts on the left end surface of the check valve body 26*a* in FIG. 2 and closes the port 22*c*. Conversely, when the valve body 23 retreats to the left side in FIG. 2 with respect to the valve seat member 22, the valve body 23 is separated from the check valve body 26*a* and opens the port 22*c*. As described above, the valve body 23 moves in the axial direction with respect to the valve seat member 22, thereby opening and closing the port 22*c*. Note that even if the valve body 23 retreats from the valve seat member 22, the movement of the check valve body 26*a* to the left side in FIG. 2 is regulated by the washer 26*c*, so that the check valve body 26*a* does not fall off from the annular recess 22*a*1.

The spring seat 24 has a disk shape, is slidably inserted into the intermediate portion on the inner periphery of the sleeve 21, and can move in the sleeve 21 in the axial direction that is a left-right direction in FIG. 2. In addition, the spring seat 24 includes a seal ring 24a in sliding contact with the inner periphery of the sleeve 21 on an outer periphery and prevents the hydraulic oil from going beyond the outer periphery of the spring seat 24 from the distal end side of the sleeve 21 and from leaking to the proximal end side to seal the inside of the sleeve 21. In addition, when the spring seat 24 moves from the distal end side to the proximal end side in the sleeve 21 and abuts on the step portion 21g, the further movement of the spring seat 24 to the proximal end side is regulated and stops in the sleeve 21, so that the spring seat 24 does not fall off from the sleeve 21.

In addition, the spring 25 is interposed between a side surface of the valve portion 23a of the valve body 23 on a side opposite to the disc portion and the spring seat 24. The spring 25 is interposed between the valve body 23 and the spring seat 24 in a compressed state and biases the valve body 23 toward the disc portion 22a of the valve seat member 22.

Therefore, the valve body 23 receives the biasing force of the spring 25 and abuts on the disc portion 22a of the valve seat member 22 to close the port 22c. When the valve body 23 receives the pressure of the compression side chamber R2 acting via the port 22c and retreats from the disc portion 22a, the valve body 23 opens the port 22c to communicate the compression side chamber R2 with the liquid chamber L and applies resistance to a flow of the hydraulic oil from the compression side chamber R2 toward the liquid chamber L. The resistance applied to the flow of the hydraulic oil by the valve body 23 changes in magnitude when the biasing force of the spring 25 is changed. Therefore, in the case of the valve V, when the position of the spring seat 24 is changed and an amount of compression applied to the spring 25 is changed, the biasing force received by the valve body 23 from the spring 25 is changed, an amount of retraction of the valve body 23 from the disc portion 22a with respect to the pressure of the compression side chamber R2 is changed, and the resistance applied by the valve body 23 when the hydraulic oil passes through the port 22c is changed. That is, in the valve V, when the spring seat 24 is displaced by displacement transmitted from the outside, the resistance applied to the hydraulic oil passing through the valve V changes.

Note that in a case where the pressure of the compression side chamber R2 received from the port 22c is small and the valve body 23 does not retreat from the valve seat member 22 against the spring 25 and abuts on the check valve body 26a to close the port 22c, the hydraulic oil moves from the compression side chamber R2 to the liquid chamber L via the orifice hole 22e. Therefore, in this case, the valve V applies resistance to the flow of the hydraulic oil by the orifice hole 22e. In addition, since the check valve body 26a receives pressure from the port 22c side with respect to the flow of the hydraulic oil flowing from the compression side chamber R2 toward the liquid chamber L, the check valve body 26a does not move while abutting on the washer 26c.

In a case where the hydraulic oil flows from the liquid chamber L toward the compression side chamber R2, while the valve body 23 is seated on the inner peripheral side of the disc portion 22a, the check valve body 26a receives pressure, compresses the spring member 26b, moves to a back side of the annular recess 22a1, and is separated from the valve body 23. Then, the hydraulic oil moves from the liquid chamber L to the compression side chamber R2 via the inside of the annular recess 22a1 and the port 22c. As described above, the valve body 23 allows the flow of the hydraulic oil flowing from the compression side chamber R2 toward the liquid chamber L and applies resistance to the flow, and the check valve body 26a allows the flow of the hydraulic oil flowing from the liquid chamber L toward the compression side chamber R2. As described above, in the present embodiment, the check valve 26 includes the check valve body 26a, the spring member 26b, and the washer 26c, and is integrally incorporated in the valve V.

The shock absorber main body d1 configured as described above operates as follows. In an extension stroke of the shock absorber main body d1 in which the piston 3 moves to the upper side in FIG. 1 with respect to the cylinder 2, the hydraulic oil moves from the extension side chamber R1 compressed by the piston 3 to the compression side chamber R2 via the extension side passage 3b. In this extension stroke, in the shock absorber main body d1, the extension side leaf valve 9 applies resistance to the flow of the hydraulic oil passing through the extension side passage 3b and generates extension side damping force that prevents extension. In addition, in the extension stroke of the shock absorber main body d1, since the piston rod 4 exits from the cylinder 2, an amount of the hydraulic oil corresponding to a volume by the piston rod 4 has exited from the cylinder 2 becomes insufficient in the compression side chamber R2. However, the insufficient amount of the hydraulic oil is supplied from the liquid chamber L of the reservoir tank 6 to the compression side chamber R2 via the check valve 26 by the free piston 18 being displaced to expand the gas chamber G.

Meanwhile, in a contraction stroke of the shock absorber main body d1 in which the piston 3 moves to the lower side in FIG. 1 with respect to the cylinder 2, the hydraulic oil moves from the compression side chamber R2 compressed by the piston 3 to the extension side chamber R1 via the compression side passage 3a. In addition, in the contraction stroke of the shock absorber main body d1, since the piston rod 4 enters the cylinder 2, an amount of the hydraulic oil corresponding to a volume by which the piston rod 4 has entered the cylinder 2 in the cylinder 2 is excessive. However, the excessive amount of the hydraulic oil is discharged to the liquid chamber L in the reservoir tank 6 via the valve V, and the free piston 18 is displaced to reduce the gas chamber G. As described above, in a contraction step of the shock absorber main body d1, the compression side leaf valve 8 applies resistance to the flow of the hydraulic oil flowing from the compression side chamber R2 to the extension side chamber R1, and the valve V applies resistance to the flow of the hydraulic oil flowing from the compression side chamber R2 to the liquid chamber L of the reservoir tank 6. Therefore, in the contraction step of the shock absorber main body d1, the compression side leaf valve 8 and the valve V generate damping force on a compression side that prevents contraction. Then, since the resistance applied to the hydraulic oil passing through the valve V can be changed by the displacement of the valve V transmitted from the outside, the shock absorber main body d1 can adjust the damping force on the compression side.

Specifically, in the shock absorber D of the present embodiment, the valve adjustment device 1 applies displacement to the spring seat 24 in the valve V, and the damping force on a compression side of the shock absorber D can be adjusted by the operation of the valve adjustment device 1.

The valve adjustment device 1 includes: a shaft 31 having a screw portion 31a on an outer periphery, the shaft 31 being displaceable in the axial direction by rotation in a peripheral direction, the shaft 31 abutting on the spring seat 24 in the valve V to apply displacement to the spring seat 24; the ball 32 received in a hole 31b opening in a radial direction from a side of the shaft 31; a spring 33 received in the hole 31b and biasing the ball 32 outward from the hole 31b; the notch case 34 that has a tubular shape, into which the shaft 31 is inserted, and that has a plurality of detent grooves 34a, 34b, and 34c and that is provided along the axial direction on an inner periphery to receive the ball 32 fitted thereinto; and an operation knob 35 that is the operation unit provided at one end of the shaft 31.

In the present embodiment, the shaft 31 is of a columnar shape and has a distal end that is the right end in FIG. 2 and that abuts on an end surface of an end of the spring seat 24 on a side opposite to the valve seat member. The shaft 31 has a proximal end that is the left end in FIG. 2 and to which the operation knob 35 is attached. The shaft 31 includes the screw portion 31a provided on the outer periphery of the distal end, the hole 31b opening from the side and receiving the ball 32, and a seal ring 31c attached to an outer periphery on the proximal end side from the hole 31b. In addition, the shaft 31 includes, between the screw portion 31a and a portion where the seal ring 31c is attached, a diameter enlarging portion 31d having an outer diameter larger than outer diameters of the other portions in the shaft 31. Note that the hole 31b opens from a side of the diameter enlarging portion 31d.

Then, the shaft 31 is inserted into the sleeve 21, and the screw portion 31a set as a right screw is screwed into the screw portion 21h of the sleeve 21 and can be displaced in the axial direction with respect to the sleeve 21 and the housing 7 by rotation in a peripheral direction in the manner of a feed screw. Note that the shaft 31 abuts on the spring seat 24 biased by the spring 25, and when the shaft 31 is operated and rotated in the peripheral direction, the shaft 31 is displaced in the axial direction to displace the spring seat 24 in the axial direction.

In the present embodiment, the screw portion 31a is a double threaded screw whose lead is doubled as compared with the lead of a single threaded screw having the same pitch. Then, in the present embodiment, a rotation amount (rotation angle) of the shaft 31 required when the resistance applied to the flow of the hydraulic oil by the valve V is switched from the minimum to the maximum is set to less than one rotation (less than 360 degrees). That is, displacement that needs to be transmitted from the outside to the valve V when the resistance applied to the flow of the hydraulic oil by the valve V is switched from the minimum to the maximum is set to displacement less than the lead of the screw portion 31a of the shaft 31. Therefore, when the shaft 31 is displaced in the axial direction by a distance shorter than the lead of the screw portion 31a, the damping force generated by the shock absorber D is switched from the minimum to the maximum. Note that if the lead of the screw portion 31a of the shaft 31 is made longer than the displacement that needs to be transmitted from the outside when the resistance applied to the flow of the hydraulic oil by the valve V is switched from the minimum to the maximum, the rotation amount (rotation angle) of the shaft 31 required when the resistance applied to the flow of the hydraulic oil by the valve V is switched from the minimum to the maximum can be set to less than one rotation (less than 360 degrees). Therefore, the number of threads of the screw portion 31a is only required to be set according to the displacement. Therefore, in a case where the screw portion 31a is a double threaded screw and lead is insufficient, the screw portion 31a is only required to be a triple or more threaded screw to obtain longer lead.

The ball 32 is received in the hole 31b of the shaft 31 together with the spring 33. The spring 33 is received deeper than the ball 32 of the hole 31b and biases the ball 32 in a direction causing the ball 32 to exit outward from the hole 31b.

Furthermore, the shaft 31 includes a serration 31e on the outer periphery of the proximal end and is fitted into an insertion hole 35a provided in the operation knob 35 and having a shape corresponding to an outer peripheral shape of the proximal end of the shaft 31. In this manner, when the operation knob 35 is attached to the shaft 31, the shaft 31 and the operation knob 35 are integrated in a rotation-stopped state. Therefore, when the user operates and rotates the operation knob 35, the shaft 31 rotates together with the operation knob 35 around an axis with respect to the notch case 34 and the sleeve 21.

Figure 3:
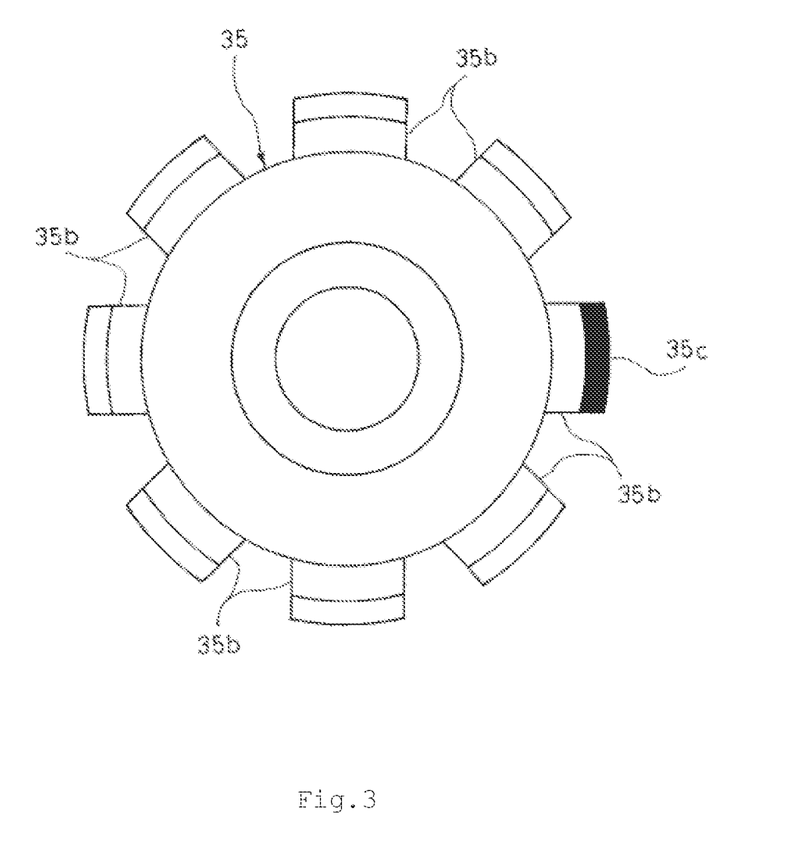
FIG. 3 is a plan view of an operation unit of the valve adjustment device according to the embodiment.

As illustrated in FIGS. 2 and 3, the operation knob 35 has a truncated cone shape and includes the insertion hole 35a opening from a bottom portion and enables the fitting of the proximal end of the shaft 31, and a plurality of ribs 35b provided on an outer periphery along the axial direction to facilitate the rotation operation by the user. One of the ribs 35b is provided with a mark 35c painted in a color different from a color of the other ribs 35b. In addition, the operation knob 35 is attached to the proximal end of the shaft 31 protruding outward from the sleeve 21 and the housing 7 and is exposed to the outside of the shock absorber main body d1 so that the user can operate the operation knob 35 from the outside of the shock absorber main body d1.

Figure 4:
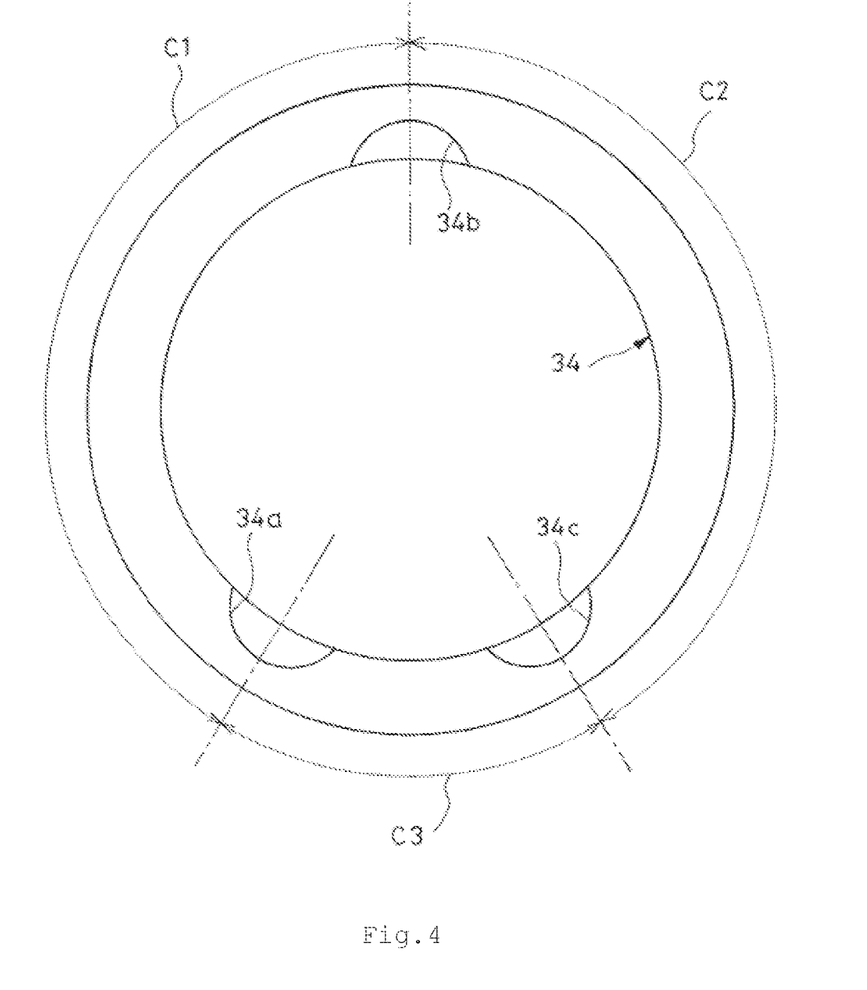
FIG. 4 is a bottom view of a notch case of the valve adjustment device according to the embodiment.

As illustrated in FIGS. 2 and 4, the notch case 34 has a cylindrical shape and is press-fitted and fixed to the inner periphery of the case housing portion 21e of the sleeve 21. Then, the inner periphery of the notch case 34 is provided with the plurality of detent grooves 34a, 34b, and 34c that is provided along the axial direction and into which the ball 32 can be fitted. The notch case 34 includes an inner diameter large diameter portion 34d in which an inner diameter on a right end side in FIG. 2 is larger than a diameter on a left end side. The detent grooves 34a, 34b, and 34c are provided in the inner diameter large diameter portion 34d on the inner periphery of the notch case 34. Specifically, the detent grooves 34a, 34b, and 34c are formed from the right end in FIG. 2, which is a side end of the valve V of the inner diameter large diameter portion 34d, extend toward the left end side, and are formed up to the middle of the inner diameter large diameter portion 34d. Furthermore, the notch case 34 includes a step portion 34e formed by reducing the diameter of the inner diameter large diameter portion 34d on the left side in FIG. 2.

In addition, as for the detent grooves 34a, 34b, and 34c, as illustrated in a bottom view (FIG. 4) of the notch case 34 viewed from the right end side in FIG. 2, the detent grooves 34a and 34c are disposed at equal intervals in a peripheral direction with the detent groove 34b as the center when the notch case 34 is viewed from the axial direction. That is, in the notch case 34 of the valve adjustment device 1 of the present embodiment, an interval C1 between the detent grooves 34a and 34b is equal to an interval C2 between the detent grooves 34b and 34c. In addition, an interval C3 between the detent grooves 34a and 34c is narrower than the interval C1 between the detent grooves 34a and 34b and the interval C2 between the detent grooves 34b and 34c.

Then, the shaft 31 is inserted into the inner periphery of the notch case 34 configured as described above. When the shaft 31 screwed into the sleeve 21 is rotated in the peripheral direction to cause the hole 31*b* provided in the shaft 31 to face any one of the detent grooves 34*a*, 34*b*, and 34*c* of the notch case 34, the ball 32 biased by the spring 33 is pushed into one of the facing detent grooves 34*a*, 34*b*, and 34*c*. As described above, in a state where the ball 32 is fitted in one of the detent grooves 34*a*, 34*b*, and 34*c*, the ball 32 is biased by the spring 33. Therefore, in order to rotate the shaft 31 in the peripheral direction, it is necessary to push the ball 32 into the hole 31*b* against the biasing force of the spring 33 while applying torque to the shaft 31 to rotate the shaft 31. Therefore, torque to be applied by the user in order to rotate the shaft 31 in the state where the ball 32 is fitted into the detent grooves 34*a*, 34*b*, and 34*c* is larger than torque to be applied by the user in order to rotate the shaft 31 in a state where the ball 32 faces a portion other than the detent grooves 34*a*, 34*b*, and 34*c* on the inner periphery of the notch case 34. This is because, in a state where the ball 32 faces an inner peripheral surface of the notch case 34 other than the detent grooves 34*a*, 34*b*, and 34*c*, the ball 32 is pushed into the hole 31*b*, and even if the shaft 31 is rotated, the ball 32 slides only on the inner peripheral surface of the notch case 34 other than the detent grooves 34*a*, 34*b*, and 34*c*, so that the resistance is small.

Therefore, in the state where the ball 32 is fitted into the detent grooves 34*a*, 34*b*, and 34*c*, the shaft 31 cannot be rotated unless the user operates and rotates the operation knob 35 by applying torque equal to or greater than predetermined torque. Thus, the rotation of the shaft 31 with respect to the notch case 34 is suppressed by a detent mechanism including the ball 32, the spring 33, and the notch case 34.

As described above, at a moment when the ball 32 is fitted into one of the detent grooves 34*a*, 34*b*, and 34*c*, vibrations are applied to the user who operates and rotates the operation knob 35, and the rotation of the shaft 31 in the peripheral direction with respect to the notch case 34 is suppressed by the detent mechanism, so that resistance is applied to the user who intends to further operate and rotate the operation knob 35. Therefore, the user perceives the vibrations and the resistance as click feelings.

As described above, the screw portion 31*a* of the shaft 31 is a right screw, and when the shaft 31 is rotated clockwise in the peripheral direction with respect to the notch case 34, the shaft 31 is displaced in a direction deeply entering the sleeve 21 and pushes the spring seat 24 to compress the spring 25. Then, when the shaft 31 is rotated clockwise, a right end surface of the diameter enlarging portion 31*d* of the shaft 31 in FIG. 2 eventually abuts on a left end surface of the screw portion 21*h* of the sleeve 21 in FIG. 2, and the further clockwise rotation of the shaft 31 and the axial-directional movement of the shaft 31 to a side of the valve V with respect to the sleeve 21 are regulated.

Therefore, when the user operates and rotates the operation knob 35 clockwise in a peripheral direction, the shaft 31 is displaced with respect to the sleeve 21 in a direction causing the shaft 31 to approach the valve V, the displacement of the shaft 31 is transmitted to the spring seat 24, causing displacement to a side of the valve seat member 22 to compress the spring 25. Then, the biasing force applied to the valve body 23 by the spring 25 increases, so that the resistance applied to the flow of the hydraulic oil by the valve V increases. Therefore, when the shaft 31 is displaced with respect to the sleeve 21 in a direction approaching the valve V by the operation of the operation knob 35 by the user, the resistance applied to the flow of the hydraulic oil by the valve V increases, so that the damping force on the compression side of the shock absorber D can be increased.

Conversely, when the shaft 31 is rotated counterclockwise in the peripheral direction with respect to the notch case 34, the shaft 31 is displaced in a direction exiting from the sleeve 21, and the spring seat 24 biased by the spring 25 is also displaced by the same distance as a distance by which the shaft 31 is displaced in the same direction as a direction in which the shaft 31 is displaced. Then, when the shaft 31 is rotated counterclockwise, a left end surface of the diameter enlarging portion 31*d* of the shaft 31 in FIG. 2 eventually abuts on the step portion 34*e* of the inner diameter large diameter portion 34*d* of the notch case 34 on the left side in FIG. 2, and the further clockwise rotation of the shaft 31 and the axial-directional movement of the shaft 31 to a side opposite to the valve V with respect to the sleeve 21 are regulated.

Therefore, when the user operates and rotates the operation knob 35 counterclockwise in the peripheral direction, the shaft 31 is displaced with respect to the sleeve 21 in a direction away from the valve V, and the spring seat 24 is pushed by the spring 25 to be displaced toward the side opposite to the valve seat member 22 to reduce the compression amount of the spring 25. Then, the biasing force applied to the valve body 23 by the spring 25 decreases, so that the resistance applied to the flow of the hydraulic oil by the valve V decreases. Therefore, when the shaft 31 is displaced with respect to the sleeve 21 in the direction away from the valve V by the operation of the operation knob 35 by the user, the resistance applied to the flow of the hydraulic oil by the valve V decreases, so that the damping force on the compression side of the shock absorber D can be decreased.

Then, in the present embodiment, the shaft 31 and the notch case 34 are attached to the sleeve 21 so that in a case where the resistance applied to the flow of the hydraulic oil by the valve V is maximized, the position of the shaft 31 in the peripheral direction is a position at which the ball 32 is fitted into the detent groove 34*a* of the notch case 34. Note that the notch case 34 and the shaft 31 are attached to the sleeve 21 in consideration so that in a case where the shaft 31 is rotated in a right direction even if relative positions between the notch case 34 and the shaft 31 in the peripheral direction are a little displaced, the right end surface of the diameter enlarging portion 31*d* of the shaft 31 in FIG. 2 abuts on the left end surface of the screw portion 21*h* of the sleeve 21 in FIG. 2 and the movement of the shaft 31 in the axial direction and the rotation of the shaft 31 in the clockwise direction is regulated before the ball 32 goes beyond the detent groove 34*a* due to the rotation of the shaft 31 and is fitted into the detent groove 34*c*. Specifically, for example, the shaft 31 is only required to be attached to the sleeve 21 so that the movement of the shaft 31 in the direction approaching the valve V is regulated by the sleeve 21, and the notch case 34 is only required to be press-fitted while the notch case 34 is disposed at a position at which the ball 32 is to be fitted into the detent groove 34*a*.

A position at which the detent groove 34*c* is set in notch case 34 is set so that when the ball 32 is fitted into the detent groove 34*c*, the resistance applied to the flow of the hydraulic oil by the valve V is minimized. Therefore, when the shaft 31 is rotated from the position at which the ball 32 is fitted into the detent groove 34*a* to a position at which the ball 32 is fitted into the detent groove 34*c*, the resistance applied to the flow of the hydraulic oil by the valve V changes from the maximum to the minimum, and a hard mode in which the shock absorber D generates the highest damping force changes to a soft mode in which the shock absorber D generates the lowest damping force. Conversely, when the shaft 31 is rotated from the position at which the ball 32 is fitted into the detent groove 34c to the position at which the ball 32 is fitted into the detent groove 34a, the resistance applied to the flow of the hydraulic oi by the valve V changes from the minimum to the maximum, and the soft mode in which the shock absorber D generates the lowest damping force changes to the hard mode in which the shock absorber D generates the lowest damping force.

In addition, a position at which the detent groove 34b is provided in the notch case 34 is set so that when the ball 32 is fitted into the detent groove 34b, the resistance applied to the flow of the hydraulic oil by the valve V is a value between the maximum and the minimum. Therefore, when the shaft 31 is operated and rotated to a position at which the ball 32 is fitted into the detent groove 34b, the shock absorber D turns into a medium mode in which the shock absorber D generates medium damping force.

Figure 5:
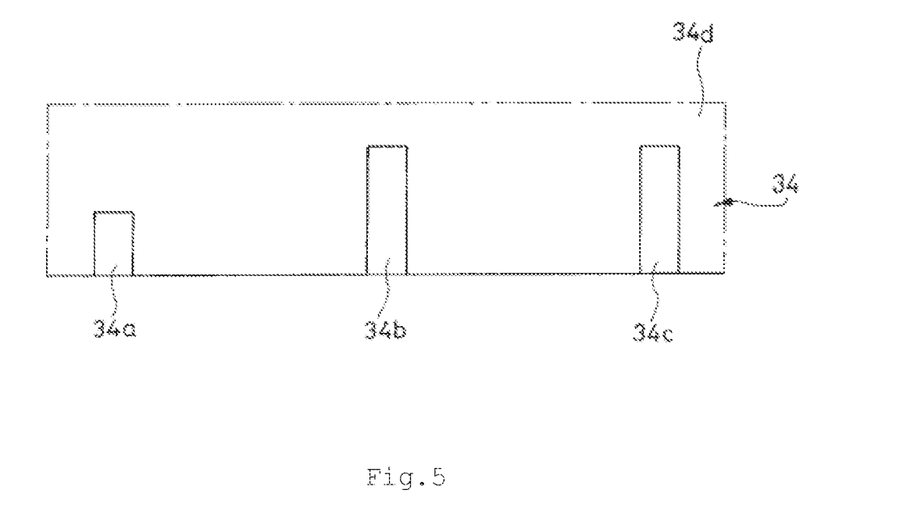
FIG. 5 is a developed view in which a part of an inner peripheral surface of the notch case of the valve adjustment device according to the embodiment is developed in a peripheral direction.

Then, as illustrated in FIG. 5, an axial-directional length of the detent groove 34a into which the ball 32 is fitted in a case where the valve V maximizes the resistance applied to the flow of the hydraulic oil flows by the valve V is shorter than the detent grooves 34b and 34c. Specifically, a length of the detent groove 34a is set so that when the ball 32 is displaced by a distance equal to or greater than the lead of the screw portion 31a of the shaft 31 in an axial direction away from the valve V from a position at which the ball 32 is fitted into the detent groove 34a, the ball 32 cannot face the detent groove 34a, and the length of the detent groove 34a is shorter than the lengths of the other detent grooves 34b and 34c.

Even if the shaft 31 rotates counterclockwise in the peripheral direction by one rotation from the position at which ball 32 is fitted into the detent groove 34a, the diameter enlarging portion 31d of the shaft 31 does not abut on the step portion 34e of the notch case 34, and the movement of the shaft 31 is not regulated due to a dimensional error, and the ball 32 goes beyond the detent groove 34c, the ball 32 is not fitted into the detent groove 34a. Therefore, in a case where the shaft 31 rotates at a rotation amount equal to or greater than a design allowable rotation amount (allowable rotation angle) due to a dimensional error, even if the shaft 31 is operated maximally, the ball 32 is fitted into each of three detent grooves 34a, 34b, and 34c only once.

Then, with the detent mechanism including the ball 32, the spring 33, and the notch case 34, the axial-directional position of the shaft 31 with respect to the sleeve 21 can be positioned at three positions corresponding to the detent grooves 34a, 34b, and 34c. When the ball 32 is fitted into the detent grooves 34a, 34b, and 34c, the rotation of the shaft 31 with respect to the notch case 34 is suppressed, and the resistance applied to the hydraulic oil by the valve V can be made constant at any of three stages. In addition, when the user operates the operation knob 35, this detent mechanism can give a click feeling to the user and make the user perceive that the damping force of the shock absorber D has been switched.

As described above, the valve adjustment device 1 transmits the displacement of the shaft 31 to the spring seat 24 related to the adjustment of the damping force of the valve V, increases or decreases the resistance applied to the flow of the hydraulic oil by the valve V, and adjusts the level of the damping force of the shock absorber D. Note that the valve adjustment device 1 causes the shaft 31 to abut on the spring seat 24 to transmit the displacement of the shaft 31 to the spring seat 24 of the valve V, but a transmission member that transmits the displacement of the shaft 31 to the spring seat 24 may be provided between the shaft 31 and the spring seat 24. The transmission member may be liquid or gas as well as solid.

In addition, in the present embodiment, the operation knob 35 has the allowable rotation amount (allowable angle) of the shaft 31 that is set to within one rotation (within 360 degrees), and the user can easily grasp what setting has been made for the resistance applied by the current valve V to the hydraulic oil and which mode among the soft mode, the medium mode, and the hard mode has been set for the shock absorber D only by visually observing the position of the mark 35c of the operation knob 35 with respect to the sleeve 21 or the housing 7.

The valve adjustment device 1 configured as described above includes: the shaft 31 having the screw portion 31a on the outer periphery, the shaft 31 being displaceable in the axial direction by rotation in the peripheral direction, the shaft applying displacement to the valve V that changes the resistance applied to the flow of the hydraulic oil (fluid) by the transmission of the displacement; the ball 32 received in the hole 31b opening in the radial direction from the side of the shaft 31; the spring 33 received in the hole 31b and biasing the ball 32 outward from the hole 31b; and the notch case 34 that has a tubular shape, into which the shaft 31 is inserted, that has the plurality of detent grooves 34a, 34b, and 34c that is provided along the axial direction on the inner periphery to receive the ball 32 fitted thereinto. At least one of the detent grooves 34a, 34b, and 34c is shorter than the other detent grooves 34b and 34c.

As described above, when the axial-directional length of the detent groove 34a of the detent groove 34a and the detent groove 34c is shortened, the detent groove 34a and the detent groove 34c having a narrow interval therebetween in the peripheral direction of the notch case 34, the detent groove 34a being positioned at a position at which the shaft 31 approaches most closely to the valve V from the notch case 34, the ball 32 does not face the detent groove 34a even if the shaft 31 excessively rotates due to a dimensional error and the ball 32 goes beyond the detent groove 34c. Therefore, in the valve adjustment device 1 of the present embodiment, even if the shaft 31 can rotate a little beyond the design allowable rotation amount (allowable angle) due to a dimensional error, the ball 32 is fitted into the detent groove 34a only once, and the number of clicks does not increase to the number of detent grooves 34a, 34b, and 34c installed or more, and the user can easily adjust the valve V so as to obtain damping force as desired while depending on the number of clicks.

Note that the design allowable rotation amount (allowable rotation angle) of the shaft 31 may be set to one rotation or more (360 degrees or more). For example, in a case where the allowable rotation amount (allowable rotation angle) of the shaft 31 is set to three rotations (720 degrees), it is possible to make a setting so that the detent groove 34a is set to be the shortest, and the ball 32 is fitted only once while shaft 31 rotates three times, the ball 32 is fitted twice while the shaft 31 rotates a length of the detent groove 34b three times, and the ball 32 is fitted three times while the shaft 31 rotates a length of the detent groove 34c three times. That is, even if the shaft 31 rotates a little beyond the design allowable rotation amount due to a dimensional error, the number of times the ball 32 is fitted into the detent grooves 34a, 34b, and 34c while the rotation of the shaft 31 is allowed can be controlled, and the number of clicks can be set to the number of clicks desired by a designer. That is, when any one of the detent grooves 34a, 34b, and 34c is set to be short, the number of times the ball 32 is fitted into the shortened detent groove 34a can be set to any number.

In addition, the number of detent grooves formed in the notch case 34 can be determined to be any number, and a width interval between the detent grooves can also be set to any value. In addition, which detent groove among a plurality of detent grooves is set to be shorter can be appropriately determined by the designer according to the number of clicks and what level the resistance applied by the valve V to the flow of the hydraulic oil (fluid) is adjusted to when the ball 32 on a side of the shaft 31 is fitted into the detent groove. As described above, a definition that at least one of the detent grooves is short naturally includes a mode in which the lengths of the detent grooves are different from each other.

In addition, the detent grooves 34a, 34b, and 34c are continuously formed on the inner periphery of the notch case 34 from the right end to the middle of the inner diameter large diameter portion 34d in FIG. 2, so that the detent grooves 34a, 34b, and 34c can be formed in the notch case 34 by simple processing.

In addition, in the valve adjustment device 1 of the present embodiment, since a multiple threaded screw with two or more threads is used as the screw portion 31a of the shaft 31 to set large lead, the rotation amount (required rotation amount, required rotation angle) of the shaft 31 required to change the resistance applied to the flow of the hydraulic oil (fluid) by the valve V from the maximum to the minimum is reduced. Therefore, the burden of the damping force adjusting work on the user is reduced, and the rotation amount (rotation angle) of the shaft 31 can be set to less than one rotation (less than 360 degrees). When the required rotation amount (required rotation angle) is set to less than one rotation (less than 360 degrees), the effect of reducing the user's burden of adjusting the resistance applied by the valve V to the flow of the hydraulic oil (fluid) and adjusting the damping force of the shock absorber D is high, and the practicability of the valve adjustment device 1 is improved.

Figure 6:
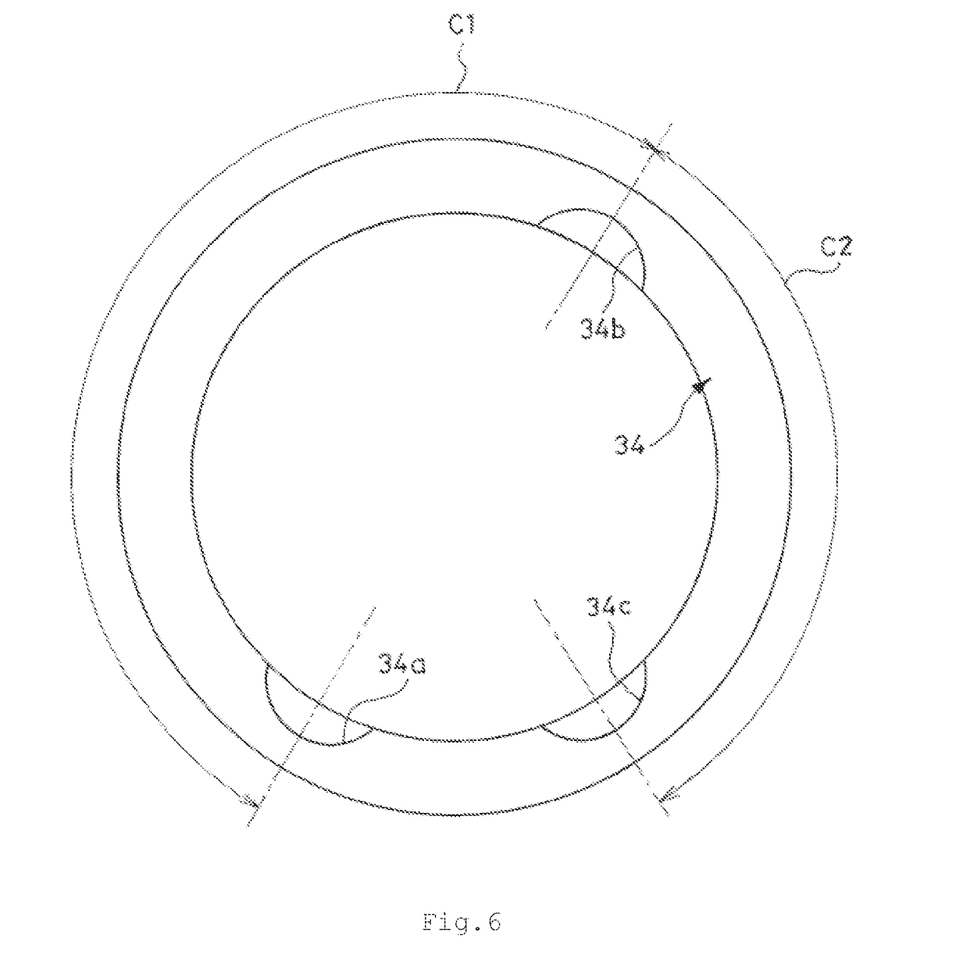
FIG. 6 is a bottom view of a notch case of a valve adjustment device according to a modification of the embodiment.

In addition, the detent grooves 34a, 34b, and 34c may be provided at unequal intervals on the inner periphery of the notch case 34. For example, as a notch case 34 according to one modification illustrated in FIG. 6, an interval C1 between a detent groove 34a and a detent groove 34b and an interval C2 between the detent groove 34b and a detent groove 34c may be set to different lengths in a peripheral direction, and individual detent grooves 34a, 34b, and 34c may be provided at unequal intervals. In a case where the valve V is not a valve that linearly changes the resistance applied to the flow of the hydraulic oil (fluid) by the displacement of the shaft 31, the detent grooves 34a, 34b, and 34c are provided in the notch case 34 at unequal intervals, whereby the resistance of the valve V set by the position of the shaft 31 can be linearly changed to be large, medium, or small. Therefore, even in a case where the valve V is configured to be a variable orifice that changes a flow path area by a needle moving close to or away from the valve seat, the detent grooves 34a, 34b, and 34c can be optimally disposed in the notch case 34, and the resistance of the valve V can be changed linearly. Even in this case, the number of detent grooves can be changed to any number, and the degree of freedom in setting a change in the resistance of the valve V is improved by the rotation amount (angle) of the shaft 31 according to a setting of the length of the detent groove and the selection of detent grooves into which the ball 32 is to be fitted.

Furthermore, in the valve adjustment device 1 of the present embodiment, the operation knob (operation unit) 35 having the mark 35c is provided at one end of the shaft 31. The valve adjustment device 1 configured as described above enables the user to view a rotational position of the operation knob (operation unit) 35, so that the user can grasp, from the outside, the magnitude of the resistance applied to the current flow of the hydraulic oil (fluid) by the valve V. In addition, when the maximum rotation amount (maximum rotation angle) of the shaft 31 is set to less than one rotation (360 degrees or more), the user can more easily grasp what setting has been made for the resistance applied by the current valve V to the hydraulic oil and the shock absorber D is set to which mode among the soft mode, the medium mode, and the hard mode only by visually observing the position of the mark 35c of the operation knob 35 with respect to the sleeve 21 or the housing 7.

In addition, the shock absorber D of the present embodiment includes: the shock absorber main body d1 that has the cylinder 2, the piston 3 movably inserted into the cylinder 2, the piston rod 4 movably inserted into the cylinder 2 and connected to the piston 3, and the valve V that changes the resistance applied to the flow of hydraulic oil (fluid) when displacement is transmitted, the shock absorber main body d1 generating damping force during expansion and contraction; and the valve adjustment device 1. The valve V changes the resistance when displacement is applied from the shaft 31. In the shock absorber D configured as described above, even if the shaft 31 can rotate a little beyond the design allowable rotation amount (allowable rotation angle) due to a dimensional error, the number of clicks does not increase, and the user can easily adjust the damping force of the shock absorber D so as to obtain damping force as desired while depending on the number of clicks.

The valve V is not limited to a configuration described above and may have a configuration in which a valve body is a needle valve body that faces a port provided in a valve seat and that can move close to or away from the valve seat, and the needle valve body is displaced by the displacement of the shaft 31, so that a flow of the hydraulic oil flowing through the port is changed. That is, the valve V is only required to have a structure in which the resistance is changed to the flow of the hydraulic oil when the displacement is transmitted from the valve adjustment device 1, and the configuration of the valve V can be appropriately designed and changed as long as the valve V has the structure.

In addition, the shock absorber main body d1 of the present embodiment includes the extension side leaf valve 9 that generates the extension side damping force and the compression side leaf valve 8 that generates the damping force on the compression side, but an orifice, a choke, or another valve may be used instead of the leaf valves.

Furthermore, the check valve 26 is incorporated in the valve V in the present embodiment, but the check valve 26 may be eliminated. A suction passage that bypasses the valve housing cylinder 7b2 and communicates between the compression side chamber R2 and the liquid chamber L may be provided, and a check valve that allows only a flow of the fluid flowing from the liquid chamber L to the compression side chamber R2 may be provided in the suction passage.

Although the preferred embodiment of the present invention has been described above in detail, modifications, variations, and changes are possible without departing from the scope of the claims.

REFERENCE SIGNS LIST

1 Valve adjustment device
2 Cylinder

3 Piston
4 Piston rod
31 Shaft
31a Screw portion
31b Hole
32 Ball
33 Spring
34 Notch case
34a, 34b, 34c Detent groove
Operation knob (operation unit)
D Shock absorber
d1 Shock absorber main body
V Valve

The invention claimed is:

1. A valve adjustment device comprising:
a shaft having a screw portion on an outer periphery, the shaft being displaceable in an axial direction by rotation in a peripheral direction, the shaft applying displacement to a valve that changes resistance applied to a flow of fluid by transmission of the displacement;
a ball received in a hole opening in a radial direction from a side of the shaft;
a spring received in the hole and biasing the ball outward from the hole; and
a notch case that has a tubular shape, into which the shaft is inserted, and that has a plurality of detent grooves that is provided along an axial direction on an inner periphery to receive the ball fitted thereinto, wherein
at least one of the detent grooves is shorter than the other detent grooves.

2. The valve adjustment device according to claim 1, wherein
the screw portion of the shaft is a multiple threaded screw.

3. The valve adjustment device according to claim 1, wherein
the detent grooves are provided on the inner periphery of the notch case at an unequal interval.

4. The valve adjustment device according to claim 1, further comprising
an operation unit provided at one end of the shaft, wherein the operation unit has a mark.

5. A shock absorber comprising:
a shock absorber main body having a cylinder, a piston movably inserted into the cylinder, a piston rod movably inserted into the cylinder and connected to the piston, and a valve that changes resistance applied to a flow of fluid when displacement is transmitted, the shock absorber main body generating damping force during expansion and contraction; and
the valve adjustment device according to claim 1, wherein the valve changes the resistance when displacement is applied from the shaft.

* * * * *